United States Patent [19]

Borken et al.

[11] Patent Number: 4,866,781
[45] Date of Patent: Sep. 12, 1989

[54] METHOD AND MEANS OF IDENTIFYING OBJECTS WITH RETRO-REFLECTED LIGHT

[75] Inventors: Richard J. Borken, St. Louis Park; William W. Durand, Edina, both of Minn.

[73] Assignee: Honeywell Inc., Minneapolis, Minn.

[21] Appl. No.: 481,188

[22] Filed: Apr. 1, 1983

[51] Int. Cl.$^4$ .......................... H04B 9/00; G06K 9/00
[52] U.S. Cl. .......................................... 382/1; 342/44; 342/54; 455/604; 455/609; 455/611
[58] Field of Search ..................... 356/5, 152; 382/1; 455/26, 600–601, 604–606, 608–609, 611, 615–616; 343/18 R, 18 B, 18 D; 342/44, 54

[56] References Cited

U.S. PATENT DOCUMENTS

| 3,989,942 | 11/1976 | Waddoups | 455/611 |
| 4,005,935 | 2/1977 | Wang | 455/609 |
| 4,134,008 | 1/1979 | DeCorlieu et al. | 455/604 |
| 4,215,936 | 8/1980 | Winocur | 455/611 |
| 4,249,265 | 2/1981 | Coester | 455/604 |

OTHER PUBLICATIONS

Yariv, Amnon, "Phase Conjugate Optics and Real-Time Holography", *IEEE Journal of Quantum Electronics*, vol. QE-14, No. 9, Sept., 1978, pp. 650–660.

Giuliano, Concetto R., "Applications of Optical Phase Conjugation", *Physics Today*, Apr., 1981, pp. 27–35.

*Primary Examiner*—Leo H. Boudreau
*Attorney, Agent, or Firm*—William T. Udseth; John G. Shudy, Jr.

[57] ABSTRACT

An optical system for determining if a target object is an object of a first kind, including means for illuminating the target object along an incident path with coherent light of a selected nature means, for retro-reflecting coherent light from an object of a first kind, means for detecting the nature of light reflected from at least a portion of the target object, means for comparing the nature of the detected light to the selected nature, and means for indicating that said target object is an object of a first kind if the nature of said detected light is the same as the selected nature. Alternative embodiments include encoding interrogating and retro-reflected light signals at both the interrogating station and target stations, and the use of a verification signal directed at the target object prior to illumination of the target object with an interrogating beam. Phase conjugate mirrors are preferably employed as the retro-reflecting means and it is preferable that the phase conjugate mirror be comprised of HgCdTe. Methods of determining whether a target object is an object of a first kind, corresponding to the disclosed devices, are also disclosed.

11 Claims, 1 Drawing Sheet

METHOD AND MEANS OF IDENTIFYING OBJECTS WITH RETRO-REFLECTED LIGHT

BACKGROUND OF THE INVENTION

1. Field of the Invention

This invention concerns the identification of objects by detecting retro-reflected light of a particular nature such as selected wavelengths or of a selected modulated form, and particularly identification by retro-reflecting an interrogating beam from a phase conjugate mirror.

2. Prior Art

Phase conjugate waves and methods and means of producing them are known. A phase conjugate wave generated by degenerate four wave mixing corresponds to a conjugate lightwave moving in the opposite direction, but otherwise identical in nature, to a second light wave with the phase of the conjugate wave reversed relative to the second wave. Phase conjugate waves can be viewed as a type of reflection of an incident, coherent wave combined with phase reversal. It is equivalent to leaving the spatial part of the electric field equation for a light wave unchanged and reversing the sign of the temporal term. The ratio of reflected power to incident power may be greater than unity (i.e., the system may have gain).

Striking consequences of phase conjugation include an incident beam being reflected from a "phase conjugate mirror" and directing the reflected beam exactly back along the path of the incident wave; and an incident beam which passes through an aberrator being distorted and reflected from a conjugate mirror, and passing back through the aberrator to emerge distortion free.

"Applications of Optical Phase Conjugation", C. R. Giuliano, Physics Today, pages 27 through 35, April 1981 describes the above basics of phase conjugation plus many applications of phase conjugation (the Giuliano article is incorporated herein by reference along with "Phase Conjugate Optics and Real-Time Holography", A. Yariv, IEEE Journal of Quantam Electronics, Vol. QE-14, No. 9, September 1978). One application disclosed is the use of phase conjugate waves in covert communications. Giuliano further discloses that four wave mixing (i.e., a nonlinear optical process where three input waves mix, often at a conjugate mirror, to yield a fourth or output wave), can be used to communicate information to one or more remotely located mobile receivers from an air or space-borne platform. The four wave mixer is situated in the transmitter and the receivers are equipped with interrogating lasers. At prearranged times, the interrogators illuminate the remotely located transmitter with lasers tuned to a predetermined operating frequency. With one of the three input waves (i.e., one of the pump waves) pulse modulated (i.e., temporal modulation), information can be transmitted back to the interrogation site as a modulated conjugate wave. Only those sites possessing the proper interrogating capability can obtain the information. Several other pump parameters, such as phase variations, can be imposed on the pump waves.

It would be advantageous to determine if a target object is a friend or foe without the need of modulation of the pump beams. It would further be advantageous to make such an identification in conditions as extreme as a battlefield where obscurants are present which are not normally present in the atmosphere. Finally, a more secure system of receiving identifying signals and information than that described by Giuliano is desirable.

SUMMARY OF THE INVENTION

The invention is an optical system for determining if a target object is an object of a first kind. The system includes means for illuminating the target object along an incident path with coherent light, means for retro-reflecting the coherent from the object of a first kind, means for detecting the nature of the retro-reflected light, means for comparing the nature of the detected light to the expected nature and means for indicating that said target object is an object of a first kind if the nature of said detected light is as expected.

Alternative embodiments enhancing the security of the system are presented. One alternative embodiment modulates the light signal at either or both the interrogating and target stations. Another embodiment uses a verification signal directed at the target object. If the target object is an object of the first kind, upon receipt of the verification signal the retro-reflecting means will be activated.

Of particular advantage for circumstances where numerous obscurants are likely to appear between the interrogating and target stations, is the use of a phase conjugate mirror because of it's properties of phase-distortion compensation and having possible gain.

Methods for determining whether a target object is an object of the first kind, corresponding to the above system, are also disclosed.

DESCRIPTION OF THE PREFERRED EMBODIMENT

Figure 1:
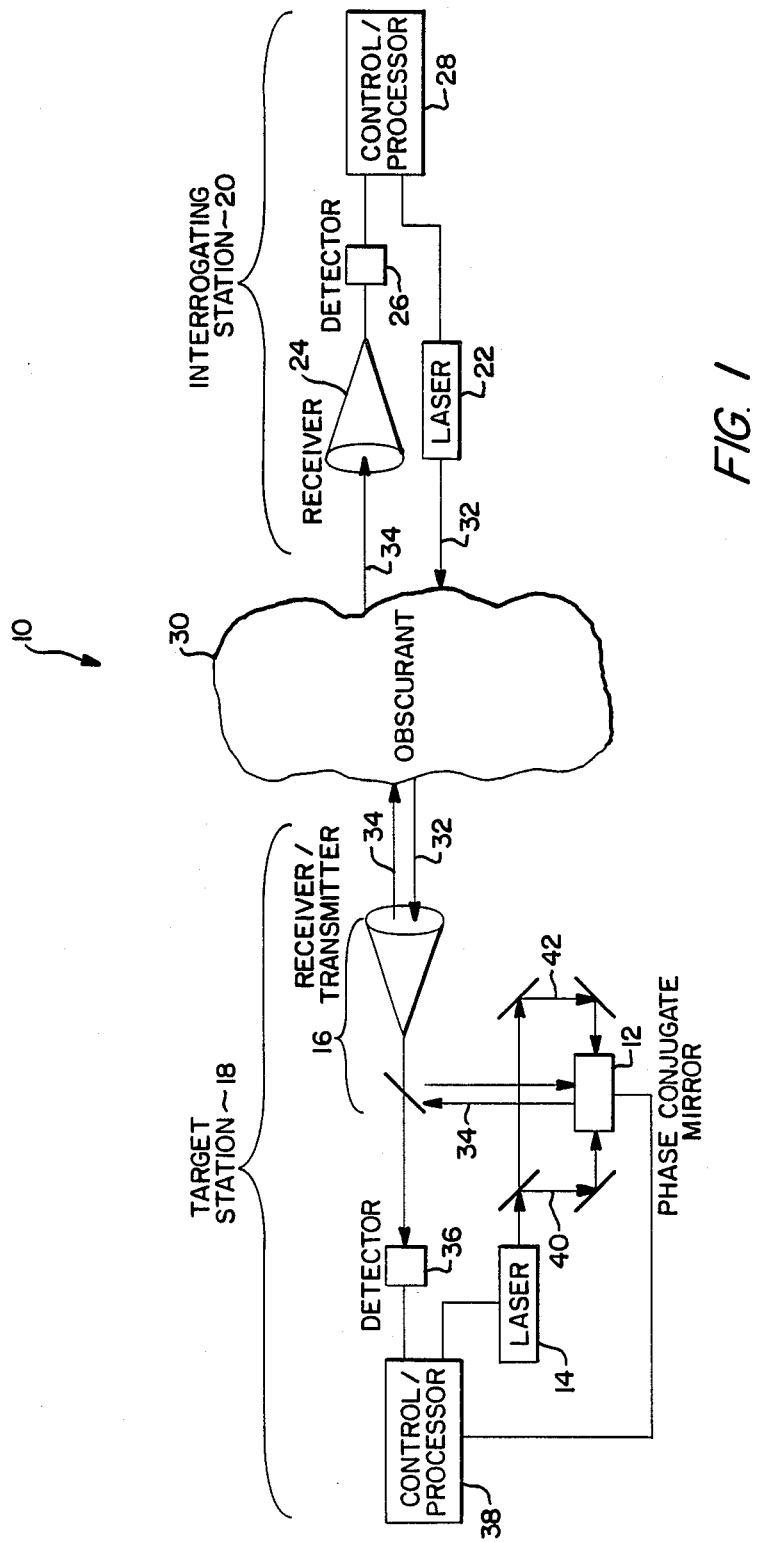
FIG. 1 shows a schematic of an optical system in accordance with the present invention.

Optical identification system 10 includes a means for retro-reflecting coherent light at wavelength $\lambda$ (such as phase conjugate mirror 12 pumped at $\lambda$ by laser 14) and means for receiving and/or transmitting light 16, both located at target station 18. An interrogating station 20 includes a means for emitting coherent light of the selected nature, e.g., at wavelength $\lambda$ (such as laser 22), means for receiving light 24, means for detecting 26 the nature of light received by receiving means 24, means for comparing (such as control/processor 28) the nature of light detected by detector 26 with the expected nature, and means for indicating that said target object is an object of a first kind if the nature of the detected light is as expected (i.e., also control/processor 28).

As used herein, the "nature" of light means any or all of the physical properties of light which could be used to identify a light signal, including, but not limited to, the spatial, temporal and spectral properties of light. For many applications the nature of the light may simply be choosing the light to have only one wavelength.

The means for retro-reflecting light at $\lambda$ is preferably a phase conjugate mirror 12, as indicated above. Since a reflected phase conjugate wave will undergo aberration compensation if passed back through the same distorting medium (such as obscurant 30) which caused the aberration and since the phase conjugate mirror may provide gain in the system, a degree of effective obscurant penetration may be achieved with mirror 12 over and above light reflected from a non-phase conjugate mirror.

In operation, system 10 emits a coherent light beam 32 with wavelength λ from interrogating station 20 towards an unknown target. Assuming an at least partially transmitting obscurant 30 located between interrogating station 20 and the target, some portion of beam 32 will pass through obscurant 30 to the target. If the target is target station 18, beam 32 is received and retro-reflected off phase conjugate mirror 12 as phase conjugate wave 34. The wavelength of wave 34 is λ since mirror 12 is pumped by laser 14 at λ and the phase conjugate mirror is based on the degenerate four wave mixing phenomena.

Beam 34 is directed by receiver/transmitter 16 back through obscurant 30. Assuming obscurant 30 has remained effectively stationary during the time between beam 32 entering obscurant 30 and beam 34 exiting obscurant 30, when beam 34 emerges from obscurant 30, it will be undistorted. The lack of distortion in beam 34 when it emerges from obscurant 30 and the possible use of gain in the system facilitates detection of beam 34.

If the target is not target station 18, no phase conjugate mirror pumped at wavelength λ is likely to be present. Thus, any light retro-reflected along the path of interrogating beam 32 will not likely be of the nature expected from a phase-conjugate mirror reflection. Thus, only if the target is target station 18, is there any substantial likelihood that a beam 34 including light of the expected nature will be received at receiver 24 shortly after interrogating beam 32 illuminates the target. Further, since a phase conjugate mirror reflects only coherent light, any incoherent light traveling along the path of beam 32 will not contribute to beam 34 if the target is target station 18. In particular, if beam 32 is coherent light of wavelength λ only it is unlikely that beam 34 will consist of light of wavelength λ only, or if beam 32 includes an image it is unlikely that beam 34 will reproduce that image when received at means 24, unless in either case target station 18 includes a phase conjugate mirror. This completes the basic identification cycle.

Under many varied atmospheric conditions, including battlefield conditions, the gases likely to be encountered as obscurant 30 can be effectively penetrated by light of a longer wavelength than the visible or near visible. Also, efficient laser sources are available at longer wavelengths. Thus, it is preferable to construct mirror 12 from a mecury-cadmium-telluride compound, since a HgCdTe phase conjugate mirror is highly efficient and effective in the long wavelength infrared wavelength range.

Beams 32 and 34 can be encoded at the interrogating station 20 and target stations 18, respectively. This would further render system 10 secure and virtually jam proof. Beam 32 can be encoded by, for example, modulation by control/processor 28. Target station 18 can include a detector 36, together with a second control/processor 38 to first detect and decode interrogating beam 32 and then modulate retro-reflected beam 34, if interrogating beam 32 contains the proper code. Modulation of beam 34 can be performed by modulating pump beams 40 and 42 or varying other mechanisms which affect phase conjugate mirror 12. interrogating station 20 could receive and process the retro-reflected beam 34 in order to verify the return signal 32.

Further, system 10 could operate in a pulsed code. In the pulsed mode, mirror 12 will normally be nonretro-reflecting (i.e., "off" or not pumped). Upon receipt of a verification signal encoded on beam 32 at interrogating station 20, pump beams 40 and 42 would be activated to pump mirror 12, thus turning mirror 12 on. Laser energy received at receiver 16 after mirror 12 was turned on would be returned to interrogating station 20.

The above example has provided that mirror 12 be pumped at one wavelength λ. However, the pumping wavelength could be varied so that if the illuminating source (i.e., laser 22) is switched to or contains other wavelengths, it is possible to retro-reflect an identifying signal containing more than one wavelength.

What is claimed is:

1. An optical system for determining if a target object is an object of the first kind, comprising:
    means for illuminating said target object along an incident path with coherent light of a selected nature;
    means for retro-reflecting coherent light from said object of a first kind;
    means for detecting the nature of light reflected back along said incident path;
    means for comparing the nature of said detected light to the nature of said coherent light; and
    means for indicating that said target object is an object of a first kind if the nature of said detected light is the same as said selected nature.

2. The system of claim 1 wherein said retro-reflecting means is a phase conjugate mirror pumped at any one time at only one wavelength.

3. The system of claim 2 wherein said phase conjugate mirror is comprised of HgCdTe.

4. The system of claim 1 wherein:
    said illuminating light includes only one wavelength.

5. An optical system for determining if a target object is an object of a first kind, comprising:
    means for emitting coherent light of a selected nature;
    means for modulating said emitted light so that said emitted light is encoded with a verification signal;
    means for retro-reflecting coherent light from said object of a first kind;
    means for detecting light incident on at least a portion of said object of a first kind;
    means for activating said retro-reflecting means in response to detection by said detecting means of said verification signal;
    means for detecting the nature of light reflected from at least a portion of said target object; and
    means for comparing the nature of said light reflected from said target object with said selected nature, so that if the nature of light reflected from at least a portion of said target object is the same as said selected nature and said light reflected from at least a portion of said target object is received after emission of said verification signal, said target object is identified as an object of the first kind.

6. The device of claim 5 wherein said retro-reflecting means is a phase conjugate mirror.

7. The device of claim 6 wherein said phase conjugate mirror is comprised of HgCdTe.

8. The device of claim 5 further including:
    means for modulating said retro-reflected light so that said retro-reflected light can be encoded; and
    means for decoding said retro-reflected light detected by said means for detecting said light reflected from at least a portion of said target object.

9. A method of determining if a target object is an object of a first kind, comprising:
    selecting the nature of light to be retro-reflected from said object of a first kind;

illuminating at least a portion of said target object with light of said selected nature;

detecting the nature of light reflected from at least a portion of said target object;

comparing the nature of said detected light to said selected nature; and indicating that said target object is an object of a first kind if the nature of said detected light is the same as said selected nature.

10. A method of determining if a target object is an object of a first kind, comprising:

emitting coherent light of a selected nature;

modulating said emitted light so that said emitted light is encoded with a verification signal;

adapting said object of a first kind to retro-reflect light incident upon at least a portion of said object of a first kind only after receipt by said object of a first kind of said verification signal;

detecting the nature of light retro-reflected from said target object; and comparing the nature of said detected light which is reflected from said target object to said selected nature so that if the nature of said detected light is the same as said selected nature and said detected light reflected from at least a portion of said target object is received after emission of said verification signal, said target object is identified as an object of the first kind.

11. The method according to claim 9 further including:

adapting said object of a first kind to modulate said retro-reflected light so that said retro-reflected light is encoded; and decoding said retro-reflected light detected by said means for detecting light reflected from at least a portion of said target object.

* * * * *